Feb. 22, 1938.                I. FLORMAN                2,109,381
AUTOMOBILE SIGNALING DEVICE
Filed Jan. 19, 1933
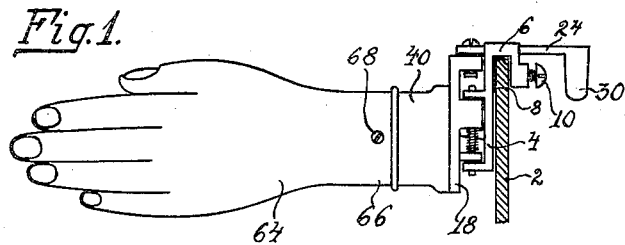
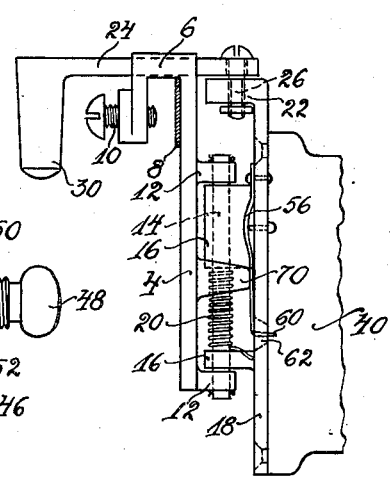
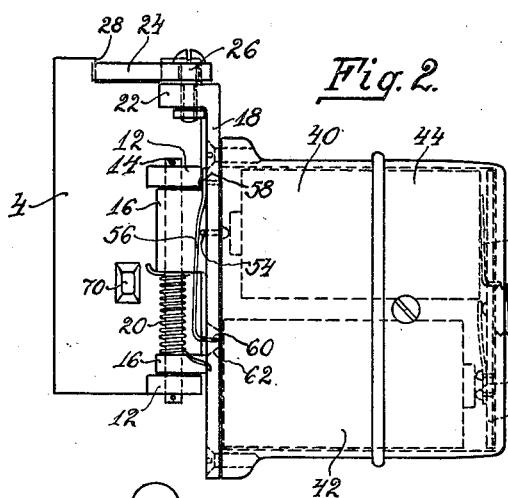
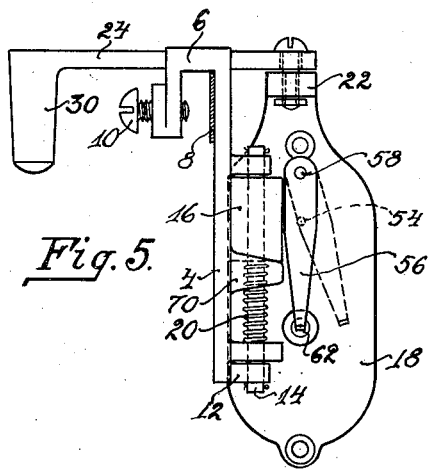
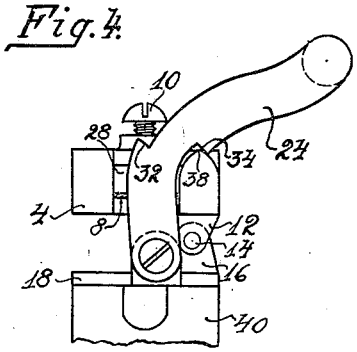
Inventor
*Irving Florman.*

Patented Feb. 22, 1938

2,109,381

UNITED STATES PATENT OFFICE 2,109,381

AUTOMOBILE SIGNALING DEVICE

Irving Florman, New York, N. Y.

Application January 19, 1933, Serial No. 652,554

13 Claims. (Cl. 177—329)

My invention relates to automobile signals and more particularly to illuminated signals of this type.

I am aware that many types of devices have been suggested for permitting a person driving an automobile to give a signal to the drivers of other vehicles without putting his arm outside the car. Such devices as heretofore made have been unsatisfactory for various reasons. Many of them have required mutilation of some part of the automobile body in order to secure them in place. Others must be connected up to the battery system of the automobile, thereby requiring wires which are difficult to protect and conceal. Most arrangements of this sort have been extremely complicated, require a mechanic for their mounting, and have nevertheless been unsatisfactory and uncertain in their operation.

The primary object of my invention is to provide a signaling arrangement which may be mounted on the upper edge of the glass of the side door of an automobile, more particularly on the driver's side of the car. When so mounted, the signal can be operated from the inside of the car when the window is either raised or lowered.

A second object of the invention is to provide a signal of this type which is self-contained and requires no connection to any outside source of current, but which is automatically illuminated upon the operation thereof to give a signal. More specifically, it includes an arrangement by which the illuminating means may be rendered inoperative for daylight driving.

Furthermore, it is my object to supply an arrangement of this type which is light, simple, inexpensive and yet fully operative and satisfactory.

Further objects and advantages of my invention will appear more fully from the following description when taken in conjunction with the drawing which forms a part thereof.

In the drawing:

Fig. 1 is a rear elevation of the device in operative position.

Fig. 2 is a detail side elevation of a portion of the device in inoperative position.

Fig. 3 is a top plan view of the operating and supporting portion in inoperative position.

Fig. 4 is a similar view in operative position.

Fig. 5 is a front elevation of the same in inoperative position.

Fig. 6 is a similar view in operative position.

The signaling device is arranged to be mounted on the upper edge of the glass 2 of the side window of an automobile. The mounting arrangement comprises a plate or bracket member 4 bent at its top to form a U-shaped portion 6, the bight of which fits over the upper edge of the glass. A thin friction member 8 of fibre or the like is secured within the U-shaped portion to give a tighter grip on the glass. The frame 4 is securely held in place by a screw 10 which presses against the glass and is mounted in one of the legs of the member 6.

The outer face of the frame 4 is provided with vertically spaced ears 12. A shaft 14 is mounted in these ears and on this shaft are pivoted ears 16 which are part of a plate 18. A spring 20 coiled around the shaft 14 normally urges the plate 18 to the open or inoperative position shown in Fig. 3.

At the top of the plate 18 is a lug 22. A lever 24 is pivoted at 26 to the lug 22 and extends through a cut away portion 28 in the bight of the U-shaped member 6, the thickness of the material of the bight being substantially the same as the thickness of the lever so that the top surface of the lever lies substantially flush with that of the bracket 6. At the free end of the lever 24 is a handle 30 so as to permit manual movement of the plate 18 from inside the car. The lever 24 is provided with oppositely directed shoulders 32 and 34 which engage corresponding shoulders 36 and 38 on the U-shaped member.

On the outer face of the plate 18 is mounted a shell 40 which is shaped to support two dry cells 42 and 44. The outer face of the shell 40 is closed by a plate 46 in which is mounted a bulb 48 or similar source of illumination. A spring contact member 50 is arranged on the plate 46 and contacts with the threaded portion of the bulb, while a second contact member 52 likewise mounted on the plate is connected with the central contact of the bulb 48. In the plate 18 is mounted a pin 54 and on the outer surface of this plate a spring 56 is fixed at 58, the free end 60 of the spring being bent downwardly and extending through an opening 62 in the plate 18. The member 58 is arranged as a pivot so as to permit the spring 56 to swing to the broken line position shown in Fig. 5 when desired.

The arrangement of the batteries or dry cells will be clear from the drawing. The terminal of the dry cell 42 engages the contact 52 while its bottom is opposite the opening 62. The dry cell 44 has its contact in engagement with the pin 54 while its bottom is engaged by the spring contact member 50. It will thus be noted that the cells are arranged in opposite directions.

The signal member itself comprises an element 64, for example a hollow hand of translucent celluloid or similar material, having its inner end 66 shaped to telescope over the shell 40, to which it may be secured by screws 68 or in any suitable manner.

On the outer face of the plate 4 is a lug 70 which, when the plate 18 swings towards the plate 4, will strike the tongue 56. It will be noted that the spring tongue 56 overlies the pin 54 and that its free end 60 normally is aligned with the opening 62.

The operation of the device should be clear from the foregoing. When the signal is not in use, the parts are in the position shown in Figs. 2, 3 and 5. The spring tongue 56 is free and its end 60 is raised out of contact with the dry cell 42. The light therefore is not illuminated and, because of the action of the spring 20, the signal member 64 will lie flat against the window. The shoulder 32 will be opposite the shoulder 36 and will prevent any outward swinging of the hand 64.

When it is desired to use the signal, the operator merely pulls on the handle 30 toward the rear, i. e. toward the right hand side of the device as shown in Fig. 3. This draws the plate 18 towards the plate 4 against the action of the spring 20 until the shoulder 34 locks over the shoulder 38, thereby holding the device in the position shown in Fig. 4. In this position, the lug 70 engages the spring tongue 56 and presses its free end 60 through the opening 62 against the bottom of the dry cell 42. This closes the circuit through the dry cells and the lamp, which is therefore illuminated and the signal is lit up at the same time that it extends out at right angles to the car in the manner shown in Fig. 1.

During daylight driving the spring 56 may be swung from its pivot 58 to the broken line position shown in Fig. 5. It will then be out of alignment with the lug 70 and opening 62 and the operation of the signal will not close the circuit.

When it is desired to release the signal to return it to inoperative position, a forward pressure on the handle 30 will release the shoulder 34 from the shoulder 38 and under the influence of the spring 20 and the pressure on the handle, the device will return to the position shown in Fig. 3.

While I have described herein one embodiment of my invention, I wish it to be understood that I do not intend to limit myself thereby except within the scope of the appended claims.

I claim:

1. In a device of the character described, a bracket, means on said bracket for securing it to the upper edge of the glass of an automobile door, said means including a U-shaped portion having a part of the bight of the U cut away, a signaling element pivotally mounted on the outer portion of said bracket, and movable to operative and inoperative positions, an operating lever pivotally connected to said signaling element for operating the same, said operating lever extending through the cut away portion of the bight, the thickness of the material of the bight being at least as great as the thickness of said operating lever.

2. In a device of the character described, a bracket having means thereon to secure the same to the edge of a portion of an automobile body, one portion of said bracket being outside of said automobile body when the bracket is secured in place, a plate pivotally mounted at one side on the outer portion of said bracket, a signaling element carried by said plate, a lever pivoted to the edge of said plate adjacent said automobile body edge portion, said lever extending over the edge of the body portion to the inside of the automobile, whereby said signaling element may be moved to operative and inoperative positions from inside the automobile, and cooperating means on said lever and bracket to lock said signaling element in operative position, said means comprising cooperating shoulders on said lever and on said bracket.

3. In a device of the character described, a bracket, means on said bracket for securing it to the upper edge of the glass of an automobile door, said means including a U-shaped portion having a part of the bight of the U cut away, a signaling element mounted on the outer portion of said bracket to swing about a vertical axis, and movable to operative and inoperative positions, an operating lever pivotally connected to said signaling element for operating the same, said operating lever extending through the cut away portion of the bight, the thickness of the material of the bight being at least as great as the thickness of said operating lever.

4. In a device of the character described, a bracket having means thereon to secure the same to the edge of a portion of an automobile body, one portion of said bracket being outside of said automobile body when the bracket is secured in place, a plate pivotally mounted at one side on the outer portion of said bracket to turn about a substantially vertical axis, a signaling element carried by said plate, a lever pivoted to the edge of said plate adjacent said automobile body edge portion, said lever extending over the edge of the body portion to the inside of the automobile, whereby said signaling element may be moved to operative and inoperative positions from inside the car, and cooperating means on said lever and bracket to lock said signaling element in operative position, said means comprising cooperating shoulders on said lever and on said bracket.

5. In a device of the character described, a support, means for securing said support on the outside of an automobile, said support having a lug thereon, a signaling element including a plate pivotally mounted on said support to turn about a vertical axis, a source of current, illuminating means mounted on said signaling element, a circuit connecting said illuminating means and said source of current including a normally open movable contact switch mounted on said plate, said movable contact being positioned to be engaged and moved by said lug when the plate is moved towards the support and a stationary contact carried by said signaling element positioned to be engaged by said movable contact when said movable contact is moved by said lug.

6. In a device of the character described, a support, means for securing said support on the outside of an automobile, said support having a lug thereon, a signaling element including a plate pivotally mounted on said support to turn about a vertical axis, a source of current, illuminating means mounted on said signaling element, a circuit connecting said illuminating means and said source of current including a normally open movable contact switch mounted on said plate, said movable contact being positioned to be engaged and moved by said lug when the plate is moved towards the support and a stationary contact carried by said signaling element positioned to be engaged by said movable contact when said movable contact is moved by said lug, said source of current being mounted in said signaling element immediately adjacent said plate and said switch.

7. In a device of the character described, a support, means for securing said support on the outside of an automobile, said support having a lug thereon, a signaling element including a plate, means for mounting said plate for movement toward and away from said support and the lug on said support, said signal being in operative signaling position when the plate is moved toward said support and lug, means for moving said plate toward and away from said support, a battery and illuminating means carried by said plate, and a circuit connecting said illuminating means and said battery including a resilient contact mounted on said plate opposite said battery, said resilient contact being positioned to be engaged by said lug when the plate is moved towards the support so as to move said resilient contact into engagement with said battery, whereby the illuminating means is rendered operative when the signal is moved to operative position.

8. In a device of the character described, a bracket having means thereon to secure the same to the edge of a portion of an automobile body, one portion of said bracket being outside of said automobile body when the bracket is secured in place, a member pivotally mounted at one side on the outer portion of said bracket, a signaling element carried by said member, a lever pivoted to the edge of said member adjacent said automobile body edge portion, said lever extending over the edge of the body portion to the inside of the automobile, whereby said signaling element may be moved to operative and inoperative positions from inside the car, and cooperating means on said lever and bracket to lock said signaling element in operative position, said means comprising cooperating shoulders on said lever and on said bracket.

9. In a device of the character described, a bracket having means thereon to secure the same to the edge of a portion of an automobile body, one portion of said bracket being outside of said automobile body when the bracket is secured in place, a member pivotally mounted at one side on the outer portion of said bracket to turn about a substantially vertical axis, a signaling element carried by said member, a lever pivoted to the edge of said member adjacent said automobile body edge portion, said lever extending over the edge of the body portion to the inside of the automobile, whereby said signaling element may be moved to operative and inoperative positions from inside the car, and cooperating means on said lever and bracket to lock said signaling element in operative position, said means comprising cooperating shoulders on said lever and on said bracket.

10. In a device of the character described, a bracket, means for securing said bracket on the outside of an automobile, said bracket having a lug thereon, a signaling element including a plate pivotally mounted on said bracket to turn about a vertical axis, a source of current, illuminating means mounted on said signaling element, a circuit connecting said illuminating means and said source of current including a normally open movable contact switch mounted on said plate, said movable contact being positioned to be engaged and moved by said lug when the plate is moved towards the bracket, and a stationary contact carried by said signaling element positioned to be engaged by said movable contact when said movable contact is moved by said lug.

11. In a device of the character described, a bracket, means for securing said bracket on the outside of an automobile, said bracket having a lug thereon, a signaling element including a plate pivotally mounted on said bracket to turn about a vertical axis, a source of current, illuminating means mounted on said signaling element, a circuit connecting said illuminating means and said source of current including a normally open movable contact switch mounted on said plate, said movable contact being positioned to be engaged and moved by said lug when the plate is moved towards the bracket, and a stationary contact carried by said signaling element positioned to be engaged by said movable contact when said movable contact is moved by said lug, said source of current being mounted in said signaling element immediately adjacent said plate and said switch.

12. In a device of the character described, a bracket, means for securing said bracket on the outside of an automobile, said bracket having a lug thereon, a signaling element including a plate, means for mounting said plate for movement toward and away from said bracket and the lug on said bracket, said signal being in operative signaling position when the plate is moved toward said bracket and lug, means for moving said plate toward and away from said bracket, a source of current comprising a battery and illuminating means carried by said plate, and a circuit connecting said illuminating means and said battery including a resilient pivoted contact mounted on said plate normally occupying a position opposite said battery and shiftable to a position away from said battery, said resilient contact being normally positioned to be engaged by said lug when the plate is moved towards the bracket so as to move said resilient contact into engagement with said battery to close the circuit, said resilient contact, when in its shifted position, being out of the path of the lug as well as away from the said battery, whereby the illuminating means is rendered inoperative even when the signal is moved to operative position.

13. In a device of the character described, two relatively movable members, means for securing one of said members on the outside of an automobile, a signaling element carried by the other member, said signaling element having illuminating means, a source of current, and a circuit connecting said illuminating means and said source of current, said circuit including a normally open movable contact switch mounted on one of said members, and a contact carried by the other member, means for moving said movable contact when the members are moved to shift the signaling element to signaling position, said movable contact being pivoted, and normally occupying a position opposite said second contact and shiftable to a position away from said second contact, said pivoted contact being normally positioned to be operated by said means when the members are moved together so as to move the pivoted contact into engagement with the stationary contact to close the circuit, said pivoted contact, when in its shifted position, being out of alignment with the stationary contact, whereby the illuminating means is rendered inoperative even when the signaling element is moved to operative position.

IRVING FLORMAN.